United States Patent
Kar et al.

(10) Patent No.: US 9,660,531 B1
(45) Date of Patent: May 23, 2017

(54) SYSTEM AND METHOD FOR IMPROVING EFFICIENCY FOR QUASI-SQUARE WAVE POWER CONVERTERS

(71) Applicant: TEXAS INSTRUMENTS INCORPORATED, Dallas, TX (US)

(72) Inventors: Monodeep Kar, Atlanta, GA (US); Saurav Bandyopadhyay, Dallas, TX (US); Jeffrey Morroni, Highlands Ranch, CO (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 29 days.

(21) Appl. No.: 14/932,705

(22) Filed: Nov. 4, 2015

(51) Int. Cl.
*H02M 3/158* (2006.01)

(52) U.S. Cl.
CPC .......... *H02M 3/158* (2013.01); *H02M 3/1588* (2013.01)

(58) Field of Classification Search
CPC ........ H02M 1/38; H02M 3/156; H02M 3/158; H02M 3/1584; H02M 3/1588; H02M 2001/0058; H02M 2003/156
See application file for complete search history.

(56) References Cited

U.S. PATENT DOCUMENTS

| | | | | |
|---|---|---|---|---|
| 8,441,238 B2* | 5/2013 | Chen | .................. | H02M 3/1588 323/222 |
| 9,343,969 B2* | 5/2016 | Yanagida | ............ | H02M 3/1588 |
| 2013/0335054 A1* | 12/2013 | Pigott | ................. | H02M 3/1588 323/311 |
| 2015/0180339 A1* | 6/2015 | Chen | ..................... | H02M 3/156 323/235 |
| 2016/0308441 A1* | 10/2016 | Chen | ..................... | H02M 3/158 |

* cited by examiner

*Primary Examiner* — Matthew Nguyen
(74) *Attorney, Agent, or Firm* — John R. Pessetto; Charles A. Brill; Frank D. Cimino (57) ABSTRACT

A power converter includes a power stage having a switch-node of a switched-mode power supply that is coupled to an input voltage node by a power field-effect transistor (FET) to energize an inductive circuit and is coupled to a ground node by a synchronous rectifier in parallel with the inductive circuit. The power converter also includes a controller coupled to the power stage. The controller controls switching of the power FET and synchronous rectifier in a complimentary manner. The controller switches on the power FET during a first switching cycle. Subsequently, the controller switches on the synchronous rectifier and, in response to a current through the inductive circuit being approximately zero, switches off the synchronous rectifier. Subsequently, the controller switches on the synchronous rectifier again to generate a negative current through the inductive circuit prior to entering a second switching cycle.

20 Claims, 5 Drawing Sheets

SYSTEM AND METHOD FOR IMPROVING EFFICIENCY FOR QUASI-SQUARE WAVE POWER CONVERTERS

BACKGROUND

Power converters, such as wall plug converters, are used for many applications such as charging mobile phones, laptops, other portable computing devices such as tablets and the like. Power supplies for use in such power converters benefit from increased power densities in order to provide a reduction in size, for example to keep pace with the trend toward increasingly svelte computing devices themselves.

Quasi-square wave refers to a power converter topology that is very efficient at heavy loads. However, at light loads—for example a 30 W converter being operated at 10 W—quasi-square wave converters are less efficient than other converter topologies. Further, various certification standards such as Energy Star may impose certain efficiency requirements on power converters, both at full and reduced load, in order for certification to be granted.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Examples of the present disclosure are directed to controlling a quasi-square wave converter topology such that converter efficiency is improved even at light loads, which results in a quasi-square wave converter that is more efficient all around and better suited for use in applications where power density is a priority. Further, these examples result in a power converter that is more likely to meet various efficiency certification standards, providing a power converter that is more attractive to potential consumers.

Figure 1:
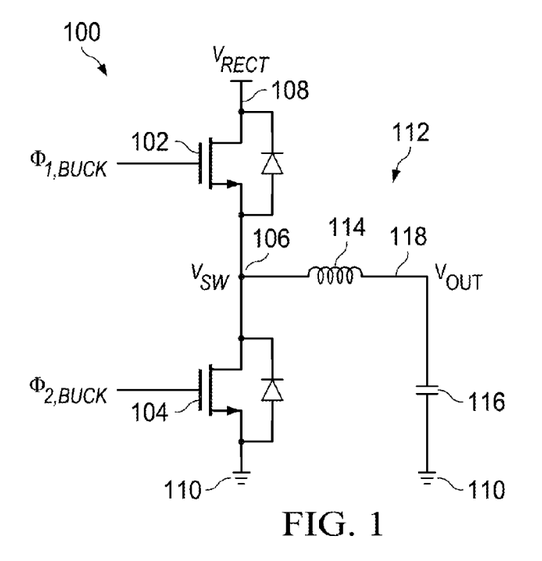
FIG. 1 shows an exemplary quasi-square wave power converter topology for use in accordance with various examples of the present disclosure.

One type of quasi-square wave topology is a buck converter, which utilizes a power stage 100 as shown in FIG. 1. The buck converter 100 includes a high-side switching device 102, which may be more generically referred to as a power field-effect transistor (FET), and a low-side switching device 104, which may be more generically referred to as a synchronous rectifier. The power FET 102 couples a switch-node 106 to an input or supply voltage node 108, while the synchronous rectifier 104 couples the switch-node 106 to a ground node 110. The buck converter 100 also includes an inductive circuit 112, which includes an inductor 114 and a capacitor 116 in series. The inductive circuit 112 also couples the switch-node 106 to the ground node 110, and thus is in parallel with the synchronous rectifier 104. The output voltage of the converter 100 is taken at Vout labeled 118.

The power FET 102 and synchronous rectifier 104 switch in a complimentary manner; that is, when one device is conducting, the other is not, and vice versa. Of course, due to design tolerances and the like, it may be that a slight overlap or gap exists between one of the devices 102, 104 conducting or not conducting. In normal operation, the switch-node 106, also labeled Vsw, is pulled to the supply voltage 108 when the power FET 102 is conducting and is pulled to ground 110 when the synchronous rectifier 104 is conducting. The inductive circuit 112 serves as a low-pass filter, which in the presence of high-frequency switching of the switch-node 106, filters the output voltage 118 to a DC voltage. The switching frequency and sizing of the inductive circuit 112 may be tailored to supply an appropriate voltage at the output 118 for a particular application.

The switch-node 106 sees capacitance both to the supply voltage node 108 and to ground 110 due to the parasitic capacitances of the power FET 102 and the synchronous rectifier 104. As a result, every time the power FET 102 or the synchronous rectifier 104 switches, additional losses occur. However, in a quasi-square wave converter topology, the energy stored in the capacitor that would otherwise be lost is recovered by resonating with an inductor, through intelligent operation of the switching devices 102, 104. In particular, and as will be explained in further detail below with respect to FIG. 2a, soft switching may be employed so that the inductor 114 assists in charging or discharging capacitance seen by the switch-node 106 to mitigate the effects of the parasitic capacitance on efficiency of the converter 100.

Figure 2A:
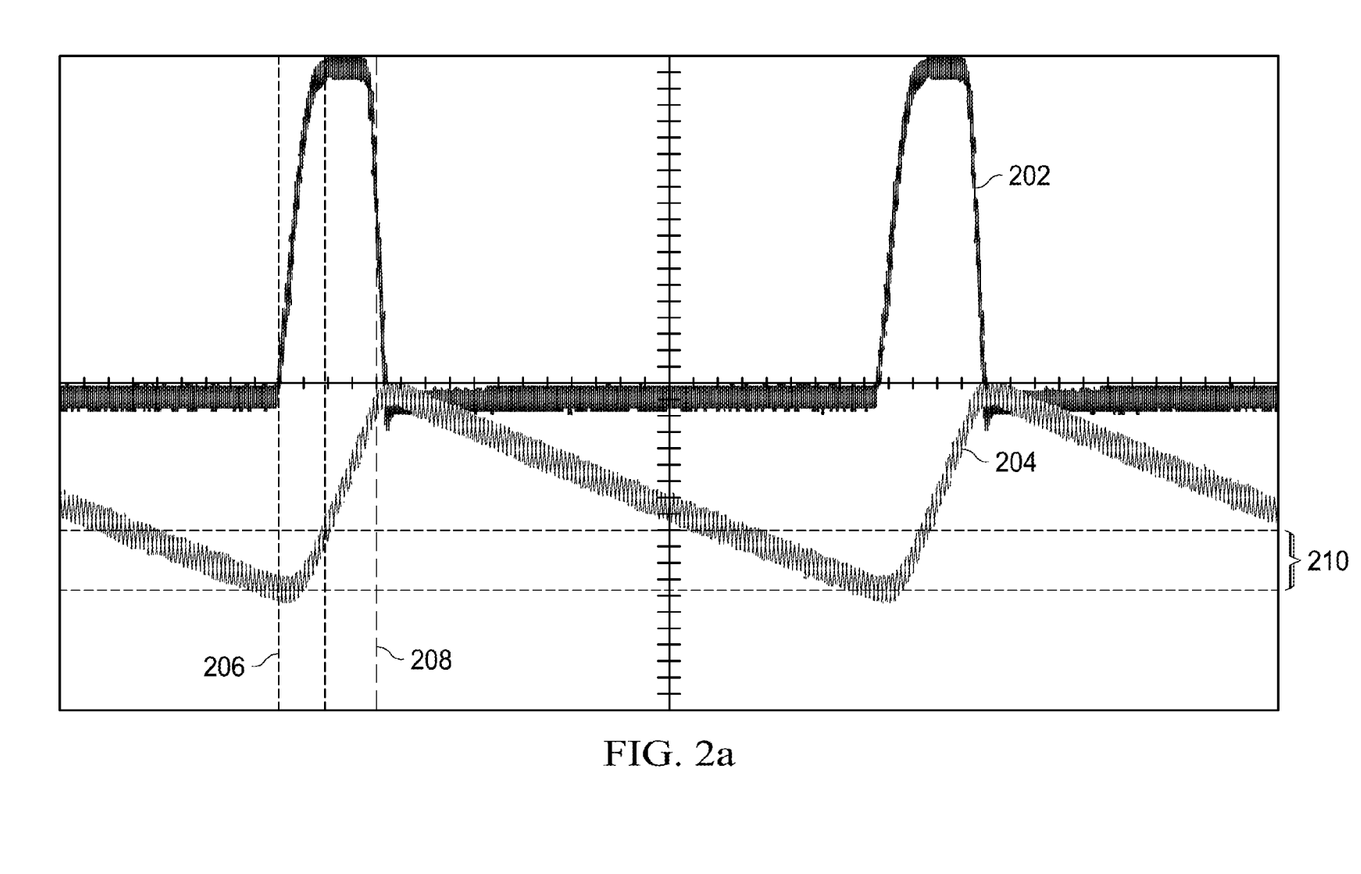
FIG. 2a shows waveforms of switch-node voltage and current through an inductive circuit as a function of time.

FIG. 2a shows a waveform of switch-node 106 voltage 202 compared to current 204 through the inductive circuit 112 as a function of time. In this example, the voltage 202 at the switch-node 106 varies from 0V to about 380V; the current 204 through the inductor 114 goes through a peak-to-peak ripple value of approximately 4.6 A. When the power FET 102 is turned on at time 206, the switch-node 106 voltage 202 ramps up to the supply voltage 108, which in turn creates a positive voltage across the inductor 114 (i.e., the supply voltage 108 minus the output voltage 118), and thus the inductor current 204 ramps up accordingly. At time 208, when the power FET 102 is turned off and the synchronous rectifier 104 is turned on, the switch-node 106 voltage 202 is pulled to ground 110, which in turn creates a negative voltage across the inductor 114 (i.e., ground 110 minus the output voltage 118), causing the inductor current 204 to ramp down.

The switching frequency of the power FET 102 and synchronous rectifier 104, along with the sizing of the inductive circuit 112, are designed in such a way that when the inductor current 204 ramps down, the current 204 is allowed to become negative as shown by 210. The negative current through the inductor 114 has the effect of resonantly pulling the switch-node 106 to the input voltage, and charging the parasitic capacitance of the synchronous rectifier 104 and resonantly discharging the parasitic capacitance of the power FET 102 to the input, which results in very high efficiencies for the converter 100, since the switch-node 106 does not have to charge the parasitic capacitances upon being pulled to the input voltage 108.

Figure 2B:
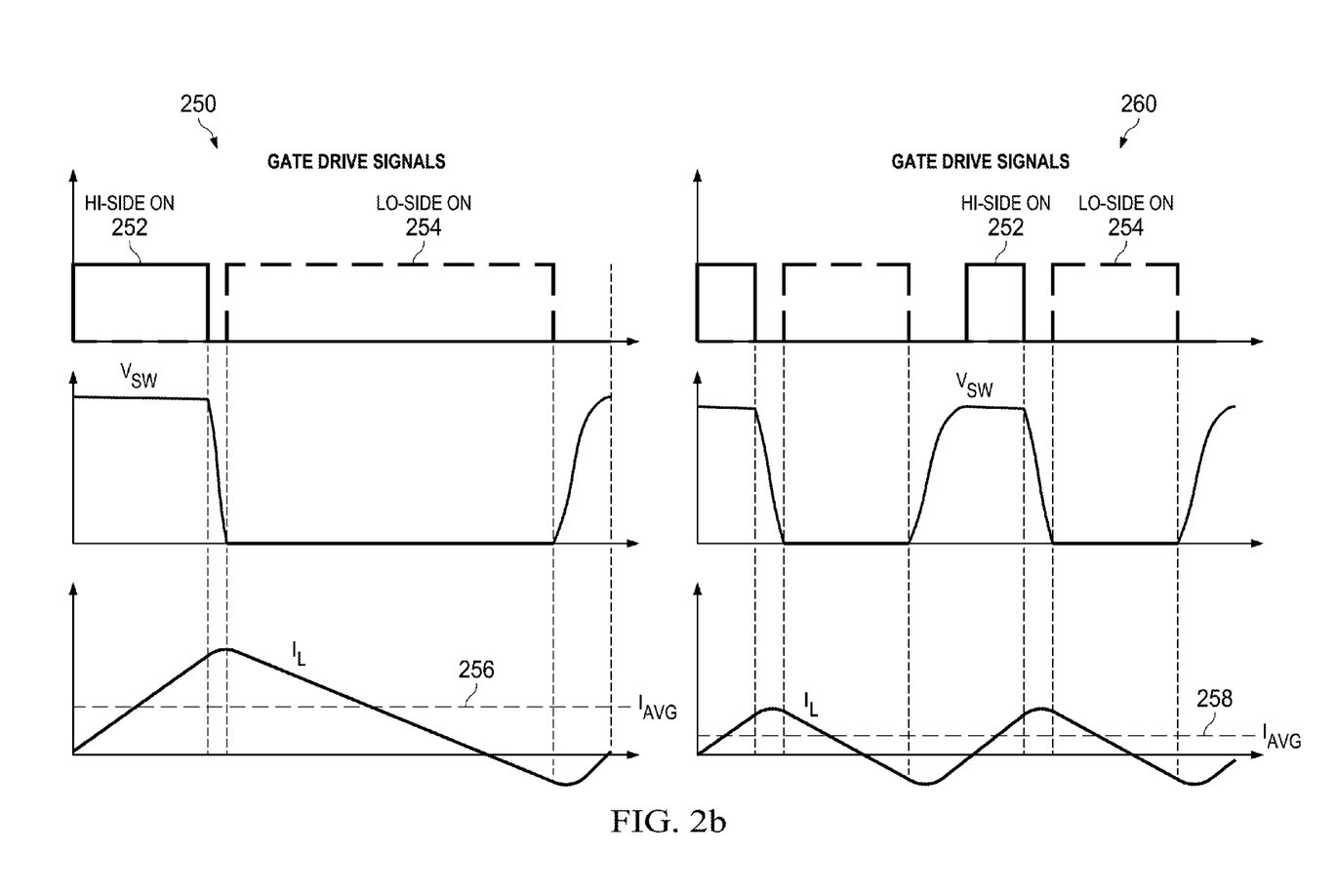
FIG. 2b shows exemplary waveforms for power converter operation at heavy and light loads.

However, as is shown in FIG. 2b, the efficiency of the converter 100 is reduced at light loads. FIG. 2b shows exemplary waveforms 250, 260 for the buck converter 100 shown in FIG. 1 at heavy loads 250 and at light loads 260. The heavy load example 250 is similar to the waveforms shown in FIG. 2a, and thus that explanation is not repeated here for brevity. However, the heavy load example 250 does further add gate drive signals 252, 254, which correspond to switching on the power FET 102 and the synchronous rectifier 104, respectively. As explained above, the current is drawn slightly negative to charge, and thus mitigate the effect of, the parasitic capacitances of the power FET 102 and the synchronous rectifier 104. The output current of the converter 100 is the average current 256, also referred to as Iavg. In the heavy load example 250, the average current 256 is high relative to the peak-to-peak current ripple. For example, the ratio of average current to the peak-to-peak current ripple value may be on the order of approximately 0.25.

However, in the light load example 260, the switching frequency of the power FET 102 and synchronous rectifier 104 is increased, as shown by gate drive signals 252, 254, in order to reduce the average current 258 through the inductor 114. However, the peak-to-peak current ripple remains relatively high as compared to the reduction in the average current 258. For example, in conventional systems, the ratio of average current to the peak-to-peak current ripple value may be on the order of approximately 0.05 or even lower. A decrease in efficiency results since the peak-to-peak ripple does not decrease proportionally with respect to the decrease seen in the average current 258. Further, because switching frequency increases at light loads, gate drive losses increase. That is, every time the power FET 102 or synchronous rectifier 104 is turned on, the gate terminal voltage is increased beyond its threshold voltage. This process requires a certain amount of energy, and thus when switching frequencies increase, the gate drive energy needs to be dissipated more frequently and thus power associated with driving the gate increases. The increase in gate drive losses causes an additional reduction in efficiency, which is roughly equal to the output power minus any gate drive losses divided by the input power. Traditional improvement strategies for light load efficiency such as burst mode and valley/peak switching suffer from increased losses due to parasitic capacitance of the switching devices and/or requiring large filters to address electromagnetic interference (EMI) issues caused by low frequency switching at light loads.

Figure 3:
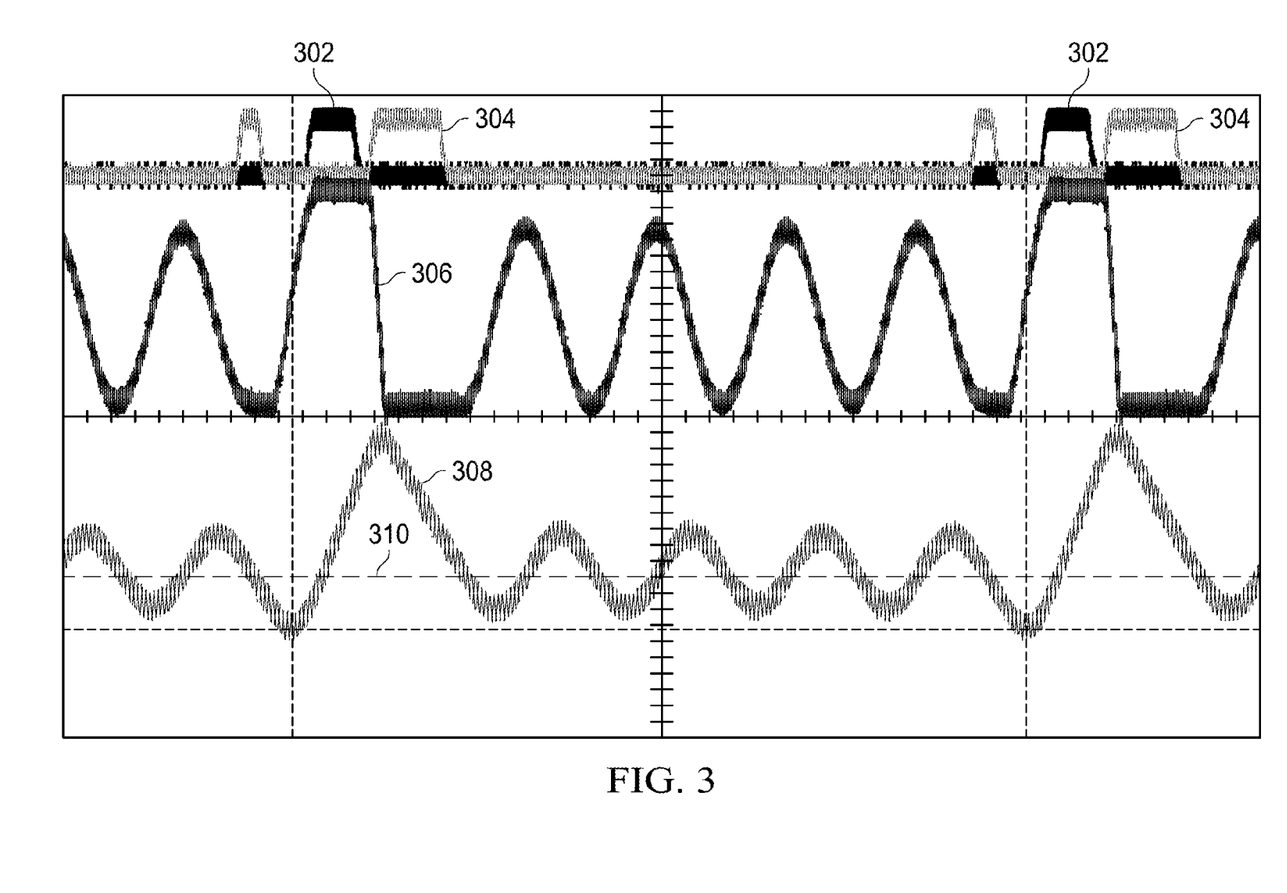
FIG. 3 shows waveforms representing gate drive control signals, switch-node voltage, and current through an inductive circuit as a function of time, and according to a control scheme in accordance with various examples of the present disclosure.

FIG. 3 shows exemplary waveforms 300 resulting from implementation of a control scheme for a quasi-square wave power converter (e.g., the buck converter 100) resulting in improved efficiency, particularly at light loads, in accordance with various examples of the present disclosure. In particular, at the beginning of a first switching cycle (denoted as 301), a gate drive signal 302 is provided to turn on the power FET 102. Subsequently, a gate drive signal 304 is provided to turn on the synchronous rectifier 104 in a complimentary manner (i.e., the power FET 102 has been turned off). However, unlike the methodology explained above where the inductor current 308 is allowed to become negative, examples of the present disclosure turn off the synchronous rectifier 104 when the inductor current 308 is approximately zero, as shown at 310, which results in the switch-node voltage 306 oscillating due to the inductor 114 resonating with the capacitance of the switching devices 102, 104.

After a number of oscillations, depending on the load placed on the power converter 100, and before turning on the power FET 102 in a next switching cycle (i.e., still in the same switching cycle), the synchronous rectifier 104 is again turned on briefly to introduce a negative current 308 through the inductor 114. The particular number of oscillations is load-dependent, and as will be explained in further detail below may be determined by a controller using, for example, a look-up table. The synchronous rectifier 104 may be turned on to introduce the negative inductor 114 current 308 when the switch-node 106 voltage 306 is near-zero.

The introduction of negative current through the inductor 114 causes the switch-node 106 to soft switch with zero voltage; that is, the switch-node voltage 306 resonates up prior to turning on the power FET 102 in the next switching cycle, permitting soft switching without the impact of the parasitic capacitances associated with the power FET 102 and the synchronous rectifier 104. The next or second switching cycle continues in a manner similar to the switching cycle just described. As a result, the switching frequency is reduced, but is still high enough (e.g., higher than a corresponding burst mode technique) to not impact EMI filter size. At the same time, zero-voltage switching is preserved minimizing losses due to the parasitic capacitances of the power FET 102 and the synchronous rectifier 104. Thus, the quasi-square wave converter efficiency at light loads is improved while zero-voltage switching is preserved.

Figure 4:
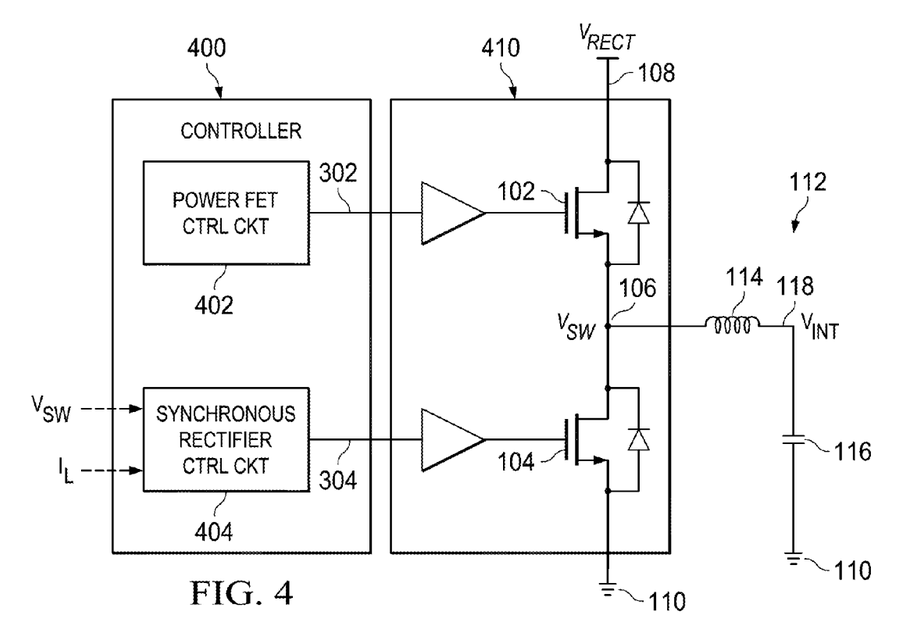
FIG. 4 shows a power converter including a controller for a power stage implementing a control scheme in accordance with various examples of the present disclosure.

FIG. 4 shows a power converter in accordance with various embodiments, including a controller 400 and a power stage 410, which the buck converter power stage explained above with respect to FIG. 1 in this particular example. One skilled in the art will appreciate that other such power stages, such as a flyback converter stage, may be utilized with examples of the present disclosure to similar benefit. The controller 400 includes a power FET control circuit 402 and a synchronous rectifier control circuit 404. It should be understood that these circuits 402, 404 are shown as separate entities for ease of explanation; however, the circuits 402, 404 may be implemented in a more tightly-coupled manner, or even together, and may share various functional blocks, inputs, outputs, and the like.

The controller 400 is coupled to the power stage 410 to control switching of the power FET 102 and the synchronous rectifier 104, in a complimentary manner as described above. The controller 400, through the power FET control circuit 402, provides a gate drive signal 302 to turn on the power FET 102 at the beginning of a first switching cycle. The power FET control circuit 402 also controls the duration of how long the power FET 102 is on based on an output load of the power converter. Subsequently, the controller 400, through the synchronous rectifier control circuit 404, provides a gate drive signal 304 to turn on the synchronous rectifier 104 in a complimentary manner (i.e., the gate drive signal 302 has turned off the power FET 102).

As explained above, the current through the inductor 114 ramps down in response to the negative voltage (i.e., ground 110 minus the output voltage 118) across the inductor 114 once the synchronous rectifier 104 is turned on. In response to the current through the inductor 114 reaching approximately zero, the synchronous rectifier control circuit 404 turns off the synchronous rectifier 104, rather than allowing the current to become negative, which is commonly needed to ensure soft switching of the switch-node 106. This results in the switch-node 106 voltage oscillating due to the inductor 114 resonating with the capacitance of the switching devices 102, 104, as explained above.

The controller, through the synchronous rectifier control circuit 404, monitors a number of oscillations of the switch-node 106 in the oscillatory state. Once a certain number of oscillations has been reached (i.e., to provide a proper switching frequency based on an output load of the power converter), the synchronous rectifier control circuit 404 again provides a gate drive signal 304 to turn on the synchronous rectifier 104 prior to entering a next switching cycle. That is, before turning on the power FET 102 in the next switching cycle, the synchronous rectifier 104 is turned on for a second time during the same switching cycle, which introduces a negative current through the inductor 114.

It should be appreciated that the switching frequency is dependent on the sizing of the inductor 114. In one example, a 15.5 µH inductor was utilized, which resulted in a switching frequency of approximately 900 KHz at full load (approximately 0.55 A). In a light-load scenarios (e.g., approximately 0.055 A), a conventional quasi-square wave converter would result in a switching frequency of approximately 1.9 MHz. However, by leveraging examples of the present disclosure, a switching frequency of approximately 380 KHz is achieved, resulting in efficiency improvements.

The synchronous rectifier control circuit 404 is configured to turn on the synchronous rectifier 104 when the voltage of the switch-node 106 is near or at 0V. Thus, the introduction of negative current through the inductor 114 causes the switch-node 106 to soft switch with zero voltage; that is, the switch-node 106 voltage resonates up prior to turning on the power FET 102 in the next switching cycle, permitting soft switching without the impact of the parasitic capacitances associated with the power FET 102 and the synchronous rectifier 104.

The controller 400, through control circuitry 402, 404, continues in a similar manner during the next or second and subsequent switching cycles. As a result, the switching frequency is reduced, but is still high enough (e.g., higher than a corresponding burst mode technique) to not impact EMI filter size. At the same time, zero-voltage switching is preserved minimizing losses due to the parasitic capacitances of the power FET 102 and the synchronous rectifier 104. Thus, the quasi-square wave converter efficiency at light loads is improved while zero-voltage switching is preserved.

Figure 5:
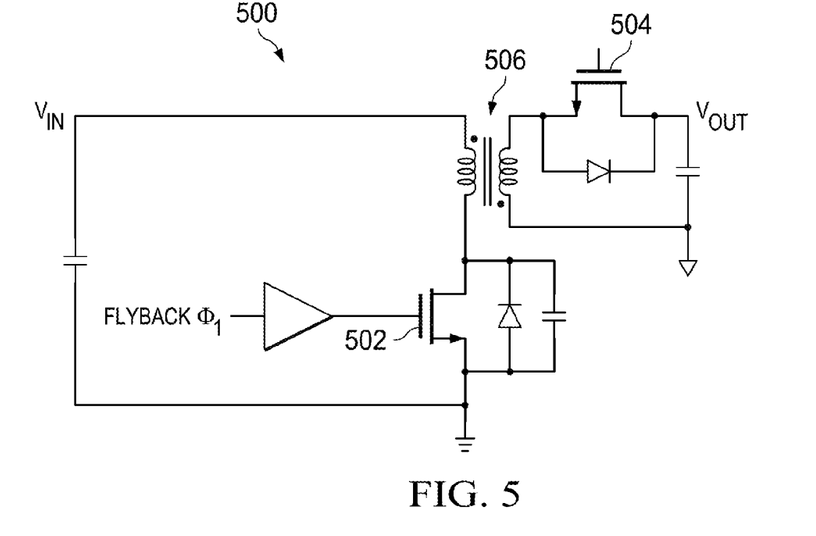
FIG. 5 shows an alternate exemplary quasi-square wave power converter topology for use in accordance with various examples of the present disclosure.

FIG. 5 shows another exemplary power converter topology 500 that may be utilized in accordance with examples of the present disclosure. The converter topology 500 is a flyback converter, and it intended to demonstrate the applicability of the control schemes and systems described herein to converter topologies other than the buck converter 100 described in FIG. 1. In particular, a corresponding power FET 502 and a synchronous rectifier 504 are present in the flyback converter 500. The power FET 502 is first turned on, which results in a transformer 506 being magnetized similar to how the buck inductor 114 is magnetized when the power FET 102 is turned on. Subsequently, the synchronous rectifier 504 is turned on and, as explained above, is turned off for a period. Of course, prior to entering a second switching cycle, the synchronous rectifier 504 is again turned on to introduce negative current to allow for soft switching of the capacitance on the drain of the power FET 502 on the primary side, as described above.

Figure 6:
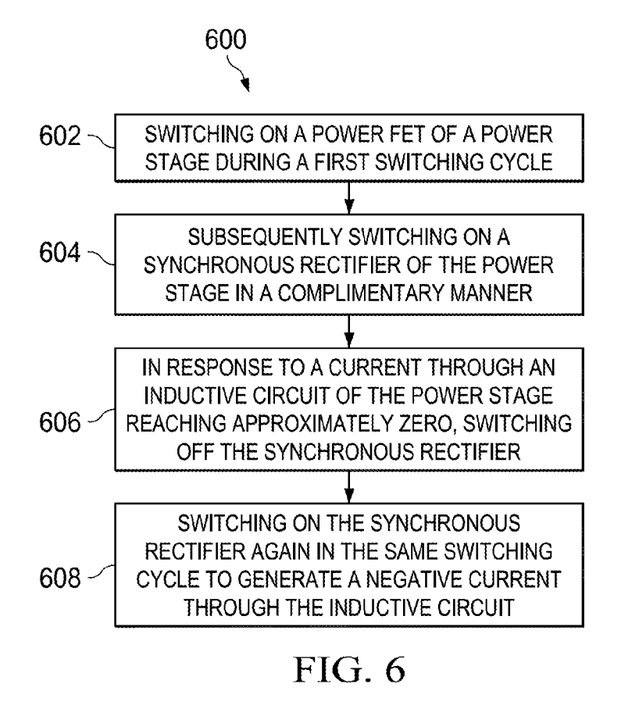
FIG. 6 shows a flow chart of a method in accordance with various examples of the present disclosure.

FIG. 6 shows a flow chart of a method 600 in accordance with various examples of the present disclosure. The method 600 begins in block 602 with switching on a power FET 102 of a power stage during a first switching cycle. The method 600 may also control the duration of how long the power FET is on based on an output load of the power converter. The method 600 continues in block 604 with subsequently switching on a synchronous rectifier 104 of the power stage in a complimentary manner. As explained above, the current through the inductor 114 ramps down in response to the negative voltage (i.e., ground 110 minus the output voltage 118) across the inductor 114 once the synchronous rectifier 104 is turned on. In response to a current through an inductive circuit of the power stage reaching approximately zero, the method 600 also includes in block 606 switching off the synchronous rectifier 104. This results in the switch-node 106 voltage oscillating due to the inductor 114 resonating with the capacitance of the switching devices 102, 104, as explained above.

The method 600 continues in block 608 with switching on the synchronous rectifier 104 again in the same switching cycle to generate a negative current through the inductive circuit. The number of oscillations of the switch-node 106 in the oscillatory state may be monitored and the timing of again turning on the synchronous rectifier 104 in block 608 may be based on reaching a certain number of oscillations (i.e., to provide a proper switching frequency based on an output load of the power converter). As explained above, this is prior to entering a next or second switching cycle, and the negative current through the inductive circuit causes the switch-node 106 to soft switch with zero voltage; that is, the switch-node 106 voltage resonates up prior to turning on the power FET 102 in the next switching cycle, permitting soft switching without the impact of the parasitic capacitances associated with the power FET 102 and the synchronous rectifier 104.

The method 600 may continue through subsequent switching cycles as described above. As a result, the switching frequency of a power converter is reduced, but is still high enough (e.g., higher than a corresponding burst mode technique) to not impact EMI filter size. At the same time, zero-voltage switching is preserved minimizing losses due to the parasitic capacitances of the power FET 102 and the synchronous rectifier 104. Thus, method 600 of controlling a quasi-square wave converter results in improved efficiency at light loads while preserving zero-voltage switching.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A power converter, comprising:
 a power stage comprising a switch-node of a switched-mode power supply coupled to an input voltage node by a power field-effect transistor (FET) configured to energize an inductive circuit and coupled to a ground node by a synchronous rectifier in parallel with the inductive circuit; and a controller coupled to the power stage and to control switching of the power FET and synchronous rectifier in a complimentary manner, wherein the controller is configured to, during a first switching cycle:
switch on the power FET;
subsequently switch on the synchronous rectifier and, in response to a current through the inductive circuit being approximately zero, switch off the synchronous rectifier; and
subsequently switch on the synchronous rectifier again to generate a negative current through the inductive circuit prior to entering a second switching cycle.

2. The power converter of claim 1 wherein a frequency of the switching cycles is based on an output load of the power converter.

3. The power converter of claim 1 wherein after the controller switches off the synchronous rectifier, the switch-node enters an oscillatory state.

4. The power converter of claim 3 wherein the controller is further configured to:
monitor a number of oscillations in the oscillatory state; and
switch on the synchronous rectifier again to generate the negative current prior to entering the second switching cycle in response to the number of oscillations reaching a predetermined threshold based on an output load of the power converter.

5. The power converter of claim 1 wherein the controller is further configured to, during the second switching cycle:
switch on the power FET;
subsequently switch on the synchronous rectifier and, in response to the current through the inductive circuit being approximately zero, switch off the synchronous rectifier; and
subsequently switch on the synchronous rectifier again to generate the negative current through the inductive circuit prior to entering a third switching cycle.

6. The power converter of claim 1 wherein the power FET and the synchronous rectifier comprise transistors, each having a parasitic capacitance between drain and source terminals, and wherein the negative current generated through the inductive circuit reduces losses due to the parasitic capacitance seen by the switch-node.

7. The power converter of claim 1 wherein a duration the power FET is on is based on an output load of the power converter.

8. A controller for a power stage, comprising:
a control circuit for a power field-effect transistor (FET) configured to energize an inductive circuit, the control circuit configured to:
cause the controller to switch on the power FET of the power stage in a first switching cycle;
a control circuit for a synchronous rectifier of the power stage configured to, in the first switching cycle:
subsequently switch on the synchronous rectifier of the power stage causing current through the inductive circuit of the power stage to decrease and, in response to the current through the inductive circuit being approximately zero, switch off the synchronous rectifier; and
subsequently switch on the synchronous rectifier again to generate a negative current through the inductive circuit prior to entering a second switching cycle.

9. The controller for a power stage of claim 8 wherein a frequency of the switching cycles is based on an output load of the power stage.

10. The controller for a power stage of claim 8 wherein after the control circuit for the synchronous rectifier switches off the synchronous rectifier, a switch-node of the power stage enters an oscillatory state.

11. The controller for a power stage of claim 10 wherein the control circuit for the synchronous rectifier is further configured to:
monitor a number of oscillations in the oscillatory state; and
switch on the synchronous rectifier again to generate the negative current prior to entering the second switching cycle in response to the number of oscillations reaching a predetermined threshold based on an output load of the power stage.

12. The controller for a power stage of claim 8 wherein:
the control circuit for the power FET is further configured to, during the second switching cycle, switch on the power FET; and
the control circuit for the synchronous rectifier is further configured to, during the second switching cycle:
subsequently switch on the synchronous rectifier and, in response to the current through the inductive circuit being approximately zero, switch off the synchronous rectifier; and
subsequently switch on the synchronous rectifier again to generate the negative current through the inductive circuit prior to entering a third switching cycle.

13. The controller for a power stage of claim 8 wherein the power FET and the synchronous rectifier comprise transistors, each having a parasitic capacitance between drain and source terminals, and wherein the negative current generated through the inductive circuit reduces losses due to the parasitic capacitance seen by a switch-node of the power stage.

14. The controller for a power stage of claim 8 wherein a duration the power FET is on is based on an output load of the power converter.

15. A method to control a power stage comprising a switch-node of a switched-mode power supply coupled to an input voltage node by a power field-effect transistor (FET) configured to energize an inductive circuit and coupled to a ground node by a synchronous rectifier in parallel with the inductive circuit, the method comprising:
switching on the power FET during a first switching cycle;
subsequently switching on the synchronous rectifier and, in response to a current through the inductive circuit being approximately zero, switching off the synchronous rectifier; and
subsequently switching on the synchronous rectifier again to generate a negative current through the inductive circuit prior to entering a second switching cycle.

16. The method of claim 15 wherein a frequency of the switching cycles is based on an output load of the power stage.

17. The method of claim 15 wherein the switch-node enters an oscillatory state after switching off the synchronous rectifier.

18. The method of claim 17 further comprising:
monitoring a number of oscillations in the oscillatory state; and
switching on the synchronous rectifier again to generate the negative current prior to entering the second switching cycle in response to the number of oscillations reaching a predetermined threshold based on an output load of the power stage.

19. The method of claim 15 further comprising, during the second switching cycle:

switching on the power FET;

subsequently switching on the synchronous rectifier and, in response to the current through the inductive circuit being approximately zero, switching off the synchronous rectifier; and subsequently switching on the synchronous rectifier again to generate the negative current through the inductive circuit prior to entering a third switching cycle.

20. The method of claim 15 wherein a duration the power FET is on is based on an output load of the power converter.

* * * * *